L. KRIEGER.
CONTROLLING APPARATUS FOR ELECTRICAL MACHINERY.
APPLICATION FILED OCT. 16, 1907.
934,820.
Patented Sept. 21, 1909.
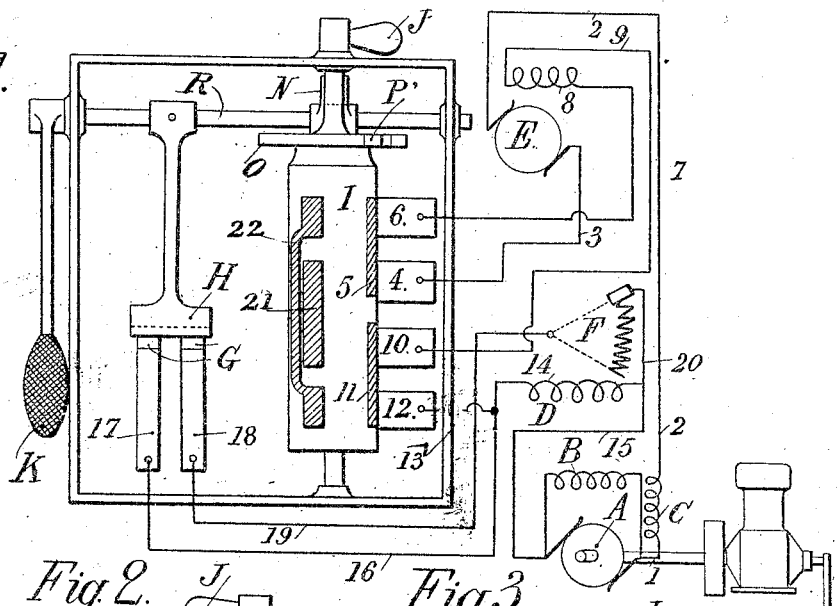
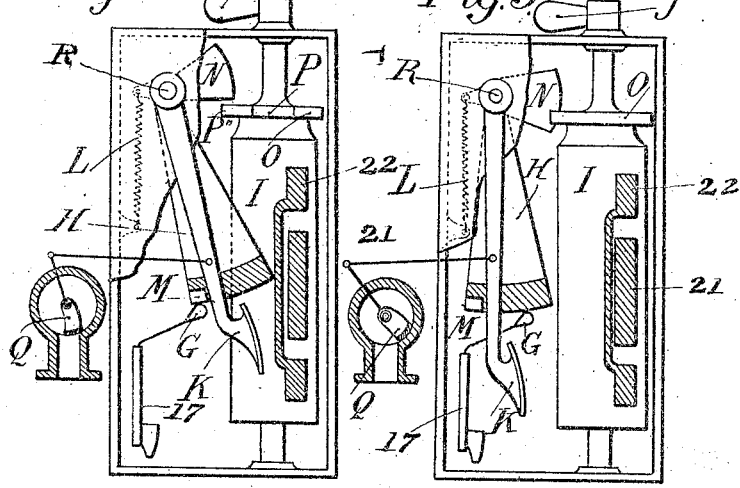
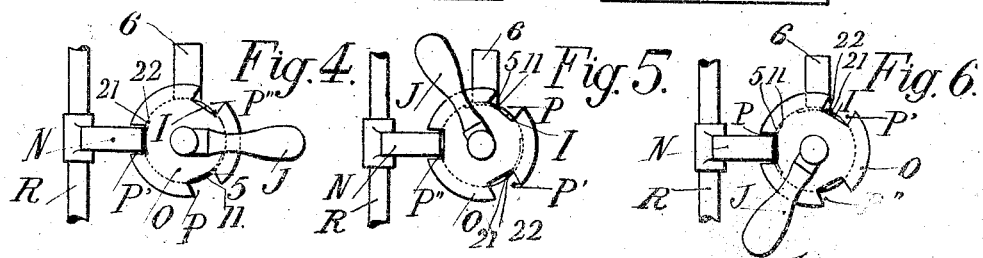
Witnesses
M. B. Taylor
E. O. Hildebrand
Inventor
Louis Krieger
by George T. Massie
Attorneys

UNITED STATES PATENT OFFICE.

LOUIS KRIEGER, OF COLOMBES, FRANCE.

CONTROLLING APPARATUS FOR ELECTRICAL MACHINERY.

934,820.

Specification of Letters Patent. Patented Sept. 21, 1909.

Application filed October 16, 1907. Serial No. 397,697.

*To all whom it may concern:*

Be it known that I, LOUIS KRIEGER, of Boulevard de Valmy, Colombes, Seine, France, engineer, have invented a new and useful Improvement in Controlling Apparatus for Electrical Machinery, which improvement is fully set forth in the following specification.

This invention relates to devices for controlling electrical machinery and it has particular reference to electrically driven vehicles, although it may be employed for controlling electrical machinery employed for other purposes.

One of the main difficulties in electrically driven vehicles is met with in the intermediate apparatus (including the switches and other parts serving to distribute the current) which are necessarily interpolated in the circuits between the electric generators and the motors for driving the vehicles. As many of these apparatus have to interrupt currents of fairly high voltage and strength and cannot be of large size, they frequently suffer much damage from sparking.

This invention, which is applicable to those systems of electric propulsion which comprise a compound wound generator, renders it possible to stop the supply of current to the motor or motors without the necessity of breaking the main circuit and consequently without danger of sparking.

According to this invention the generator, which is excited partly by a shunt winding across the brushes and partly by a series winding of like polarity, is provided with a second series winding opposed to the two other windings and of greater power than the first series winding; during normal working this demagnetizing series winding is short circuited either upon itself or upon a controlling rheostat.

The electric drive employed comprises a generator having an armature wound in the usual manner and a field magnet of any usual type but provided with the following windings: 1. A shunt excitation such that the machine can supply current under favorable conditions at a critical speed at least equal to and usually greater than the normal retardation of the motor, its working under the most favorable conditions being assured, without taking into account any delivery of current from the machine and therefore without taking into account the reaction of the armature or the ohmic losses therein. 2. An excitation, coöperating with the shunt excitation above described, in series with the main circuit, and so arranged that for a given delivery of current from the machine it compensates for the reaction of the armature and the ohmic losses, and is moreover sufficient for a supply of current when at a speed not exceeding the normal retardation of the motor. 3. A series excitation, opposed to the two preceding, which is in series with the main circuit and which during normal working of the machine is short circuited. When this last winding is in circuit, it more than compensates the series winding coöperating with the shunt winding, and so stops the supply of current from the generator, current is therefore cut off without breaking the circuit.

The two free poles of the machine connected to the field magnet series windings above mentioned are directly connected to the motors driving the vehicle, with or without the interposition of a switch for reversing the current in the field magnets of the motors. In order to obviate the necessity of breaking the main circuit by this switch it is according to this invention connected with the part establishing and preventing the short circuit, this connection being effected in such a manner that the switch can be operated only when no current is flowing in the circuit. No sparking can therefore take place.

The motors driving the vehicle may have their field magnets arranged in series or they may be provided, besides the series windings of the field magnets, with a second winding in parallel from the brushes of the armature and opposed to the series windings, in such a manner as to obtain a very variable couple with small variations of strength of the current.

In the illustrative diagrammatic drawings: Figure 1 is a front elevation of apparatus arranged in accordance with this invention. Fig. 2 is a side elevation with parts removed showing the apparatus in a position of rest. Fig. 3 is a similar view in the working position. Figs. 4, 5 and 6 are detail plan views illustrating different positions of the controlling switch.

A denotes the generator in the field of which is a shunt coil B and a series coil C. In addition to these exciting coils, I also provide a demagnetizing series coil D which is opposed to the coils B and C and of greater power than the series coil C. The shunt coil B has its ends connected to the brushes of the generator while the coil C has one end connected to one of said brushes by a conductor 1 and its other end carried into the main circuit by a conductor 2. The demagnetizing coil D has one end in the main circuit and its other end connected by a conductor 15 with the brush of the generator opposite the brush to which the exciting coil C is connected. The wire or conductor 2 runs from the exciting coil C to a brush of the motor E which drives the vehicle and from the opposite brush of the motor a wire or conductor 3 extends to a terminal or contact 4 arranged to make electrical contact with a controller or reversing switch I. A similar terminal or contact 6 is connected by a conductor 7 to the field winding 8 of the motor E from which winding a wire or conductor 9 leads to a terminal or contact 10 similar to the contacts 4 and 6. A like contact 12 is connected by wires 13 and 14 to the outer end of the demagnetizing coil D and the several terminals 4, 6, 10 and 12 are arranged in position to make electrical contact with a controlling or reversing switch I to close the main circuit. As shown, this switch I is cylindrical in form and is rotatably mounted in a suitable support. Upon the body of the switch are a plurality of conductor strips or plates 5, 11, 21 and 22, it being understood, of course, that the body is of insulating material. The plates or strips 5 and 11 are arranged in the same axial or longitudinal line on the switch body with their ends out of contact and each one is long enough to engage two of the terminals, as shown in Fig. 1 in which figure the plate 5 connects the terminals 4 and 6 and the plate 11 connects the terminals 10 and 12. The contact plate 21 is so arranged that it will connect the terminals 4 and 10 when the switch is turned to the proper position while in that same position the plate 22 will connect the terminals 6 and 12, the plate 21, as clearly shown, being located between the ends of the plate 22 and the body of the plate 22 being turned out of the direct path between its ends so as to avoid the plate 21.

The switch body is provided with an operating handle J at its upper end and below the said handle has an annular flange or collar O in the edge of which are three notches P, P', P'', any one of which may be engaged by a locking arm N in order to hold the switch in any position to which it may be turned. This locking arm N is rigid with a rock shaft R which is mounted adjacent the switch and is provided with a pedal K by which it may be operated. A sector-shaped circuit-closing arm H is also carried by the rock shaft R and the lower curved face of this arm is arranged to ride upon and be constantly touching the spring contact fingers G. With the exception of an insulating strip M at its rear edge, the lower surface of the arm H is of conducting material, so as to make electrical connection with the fingers G and close a circuit through the same. The spring contact fingers G are mounted on the upper ends of terminals 17, 18, from which wires or conductors 16, 19, respectively, extend, the conductor 16 joining with the conductor 14 to communicate electrically with one end of the demagnetizing coil D, while the conductor 19 passes to a rheostat F which is connected by a conductor or wire 20 with the wire 15 leading to the generator.

The pedal K is arranged to operate a governing valve Q of a carbureter, which controls the admission of carbureted air to a gas engine employed to drive the generator A. This governing valve is open to the minimum extent when the pedal is in a position of rest, shown in Fig. 2, and a spring L attached to the rock shaft R tends to maintain the pedal in said position. In this position, it will be noticed that the fingers G are in contact with the insulating strip M, and, consequently, the circuit through said fingers is broken. It will also be observed that when the pedal is in the position of rest the arm N will project above the collar O and, consequently, it can not be depressed unless it is directly over one of the notches of said collar and that when said arm engages one of the notches rotation of the switch is prevented.

Supposing the vehicle to be at rest, the gas engine is started in the usual manner by means of a starting crank or other device, the pedal being left to itself. The generator will now rotate without load at a speed less than that which supplies current and the vehicle cannot start because the exciting coil and the demagnetizing coil are both included in the main circuit and as the demagnetizing coil is of greater power than the exciting series coil, any current generated will act in an opposite direction to the shunt coil which produces the magnetic field of the generator. The switch being turned to the position shown in Figs. 1 and 5, the main circuit is closed and is as follows: Over wire 1, through coil C, over wire 2 to the armature of motor E; from the motor E over wire 3 to terminal 4, through strip 5 to terminal 6 and over wire 7 to the field coil 8 of the motor E and then over wire 9 to terminal 10; through strip 11 to terminal 12 and then over wires 13 and 14 to demagnetizing coil D, whence it returns to the generator over the wire 15. If, now, it be desired to start the vehicle, the operator presses upon the pedal K so as to open the valve Q to a greater extent and thereby permit the gas engine or prime motor to operate at a higher speed, this movement of the pedal being possible because the notch P″ is in position to receive and accommodate the arm N. As the pedal swings rearward, the conducting surface of the circuit-closing arm H is brought into contact with the fingers G (see Fig. 3) and the demagnetizing coil D will be short circuited, the current passing as before described to the terminal 12 and the wire 13, thence passing over the wire 16 to the terminal 17, the fingers G and arm H, then over the terminal 18 and wire 19, to a rheostat F, whence it returns to the generator over the wires 20 and 15. As the main circuit has not been broken, the rheostat F arranged in series with the terminals 17 and 18 permits the demagnetizing coil to be shunted more or less as may be desired. At the start, the rheostat is placed at its minimum resistance and the demagnetizing coil is short-circuited, but if the rheostat be moved to its maximum resistance the short-circuit will be practically suppressed, so that by varying the adjustment of the rheostat the speed of the motor may be varied, said speed increasing in the same direction as the decrease of the resistance in the rheostat, that is to say, in the same direction as the action of the demagnetizing winding on the generator A decreases.

To lessen the speed of the prime motor or gas engine, the driver permits the pedal K to swing forward under the influence of the spring L, thereby cutting off the supply of fuel. In this way, the speed of the vehicle may be decreased without any variation in the circuits. To stop the vehicle, the pedal is permitted to swing forward to the limit of its movement thereby bringing the insulating strip M into contact with the fingers G, and, consequently, breaking the short circuit of the demagnetizing coil so that the full strength of the current will tend to pass through said coil, provoking an instantaneous fall of voltage at the terminals of the generator and, therefore, suppressing the current. The switch may now be turned to the position shown in Fig. 4, in which the arm N may be brought into engagement with the notch P′ and all the terminals 4, 6, 10 and 12 will bear against the non-conducting portion of the switch so that no circuit is closed and the prime motor will rotate under no load.

To accomplish a reverse or backward travel of the vehicle, the switch is turned to the position shown in Fig. 6, bringing the conductor strip 21 into contact with the terminals 4 and 10, and the conductor strip 22 into contact with the terminals 6 and 12. The main circuit will be, as before, to the armature of the motor, wire 3, terminal 4, strip 21, terminal 10, wire 9, field coil 8 of motor E, wire 7, terminal 6, strip 22, terminal 12 and wire 13, whence it will pass to the generator through the demagnetizing coil D or over the short circuit according to the position of the pedal, as before described.

While I have applied my invention more particularly to motor vehicles, it is not confined to such specific use and is applicable to the hand control of all electrical generating machinery.

It will be seen that in order to change from a delivery of no current to a delivery of the maximum current to the electric motors driving the vehicle and vice versa to change from the maximum power to zero, it is only necessary to cut out or to include shunts from the main circuit without breaking this circuit and as this operation is effected at two points of like polarity without appreciable difference of potential the short circuiting and putting into circuit takes place without sparking.

Having now particularly described and ascertained the nature of my said invention and in what manner the same is to be performed, I declare that what I claim is:—

1. The combination with a generator having a shunt winding and a series winding, of a demagnetizing winding of greater power and opposed to the said series winding, and means for short circuiting said demagnetizing winding.

2. The combination with a generator having a shunt winding and a series winding, of a demagnetizing winding opposed to and of greater power than the said series winding, and a movable contact adapted to connect the ends of the demagnetizing winding to short-circuit the same.

3. The combination of a generator having a shunt winding and a series winding, a motor in circuit with the generator, a demagnetizing coil opposed to and of greater power than the said series winding inserted in the circuit with the generator and the motor, and means for short-circuiting said demagnetizing coil.

4. The combination with a generator having a shunt winding and a series winding, of a demagnetizing winding of greater power and opposed to the series winding, means for forming a short-circuit around said demagnetizing winding, and a variable resistance in said short-circuit.

5. The combination with a generator having a shunt winding and a series winding, of a demagnetizing coil opposed to and of greater power than the said series winding, a rheostat, and means for forming a short circuit around the demagnetizing coil which will include the said rheostat.

6. The combination with a generator having a shunt winding and a series winding, of a demagnetizing coil opposed to and of greater power than the said series winding, a main circuit including the said series winding and the demagnetizing coil, a short-circuit including the demagnetizing coil, contact fingers in said short-circuit, and a circuit-closing arm bearing constantly upon said fingers and having conducting and non-conducting portions.

In testimony whereof I have signed this specification in the presence of two subscribing witnesses.

LOUIS KRIEGER.

Witnesses:
  JEAN VAUCHER,
  DEAN B. MASON.